Nov. 3, 1970 D. W. HILLIS ET AL 3,538,348

SENSE-WRITE CIRCUITS FOR COUPLING CURRENT MODE LOGIC CIRCUITS TO SATURATING TYPE MEMORY CELLS

Filed July 10, 1967

INVENTOR.
Durrell W. Hillis
Donald E. Murray

BY

Mueller, Aichele & Rauner

ATTY'S.

3,538,348

SENSE-WRITE CIRCUITS FOR COUPLING CURRENT MODE LOGIC CIRCUITS TO SATURATING TYPE MEMORY CELLS

Durrell Wayne Hillis, Phoenix, Ariz., and Donald Edward Murray, Geneva, Switzerland, assignors to Motorola, Inc., Franklin Park, Ill., a corporation of Illinois Filed July 10, 1967, Ser. No. 652,228
Int. Cl. H03k 5/20
U.S. Cl. 307—238 6 Claims

ABSTRACT OF THE DISCLOSURE

A sense-write circuit for memories having first and second biasing transistors emitter coupled to first and second write transistors respectively at data-input data-output points. A pair of emitter coupled current switches are connected respectively to the data-input and data-output points and are further coupled to the write transistors. These current switches control the potential at the data points in response to signals applied to the write transistors. The voltage imbalance at the data points is sufficient in magnitude to change the conductive state of a saturated memory cell.

This invention relates to high speed logic circuitry and more particularly to sense-write logic circuitry adapted for use with multiple emitter saturated memory elements.

BACKGROUND OF THE INVENTION

In integrated memory circuit construction, it is frequently desirable to use saturating memory cells such as multiple emitter flip flops rather than nonsaturating memory cells because more cells of the saturating type can be constructed within a given area on a semiconductor die. The multiple emitter cell configuration also provides partial decoding at the cell, thus reducing component count and cycle time in a system. However, in current mode logic systems it is also desirable to use sense-write circuitry for the memory cells which has current mode nonsaturating inputs and outputs compatible with other current mode logic circuitry. Thus, in the past whenever saturating memory cells were used to store information in current mode systems, it was necessary to sense and write into the saturated memory cells using saturated sense and write logic circuits and then translate the saturated logic to nonsaturated logic in order to be compatible with the current mode logic circuitry surrounding the memory. This scheme required additional translating circuits which increased the power, size and cost of the overall memory system, and these additional translating circuits increased the cycle times of the system considerably.

SUMMARY OF THE INVENTION

An object of this invention is to provide nonsaturated current mode sense-write circuitry adapted for use with saturated memory cells.

Another object of this invention is to provide sense-write circuitry of the type described which may be connected directly between saturated logic memory cells and nonsaturated current mode logic circuitry without requiring additional stages for translating saturated logic to nonsaturated logic.

The present invention features sense-write logic circuitry having constant voltage and constant current conditions at the data in-data out points of the circuit; these points will be referred to hereinafter as "data points." The data points are connectable to data lines leading into saturated memory cells and provide constant current and voltage conditions at these cells except when the sense write logic circuitry is used to write into the cells. The above logic circuitry having the above described constant voltage and constant current conditions at the data points thereof is operative to determine the binary state of the cell by sensing the cell current in the appropriate data line when the cell is addressed. Thus, saturated logic cells as well as non-saturated cells may be sensed by the logic circuitry, and the need for extra circuits to translate the saturated logic to nonsaturated logic is eliminated.

Briefly described, the sense write circuitry according to this invention includes: first and second biasing transistors are connected to a first bias potential and further emitter coupled to first and second write transistors respectively. A first current switch is connected to one data point which is common to the first write transistor and the first biasing transistor, and the potential at the first data point is controlled by the first current switch. The first current switch is also connected to the first write transistor and is, in turn, conductively controlled by write signals applied to the first write transistor. A second current switch is connected to a second data point common to the second write transistor and to the second biasing transistor for controlling the potential on the second data point in response to write signals applied to the second write transistor and coupled to the second current switch. The first and second current switches each include a pair of emitter coupled transistors which switch against each other in response to write signals applied to the first and second write transistors respectively and simultaneously raise the potential at one of the data points while lowering the potential at the other data point. This differential voltage change causes a voltage imbalance which, when applied to a saturated memory cell, will change the binary conductive state thereof.

DESCRIPTION OF THE PREFERRED EMBODIMENT

Figure 1:
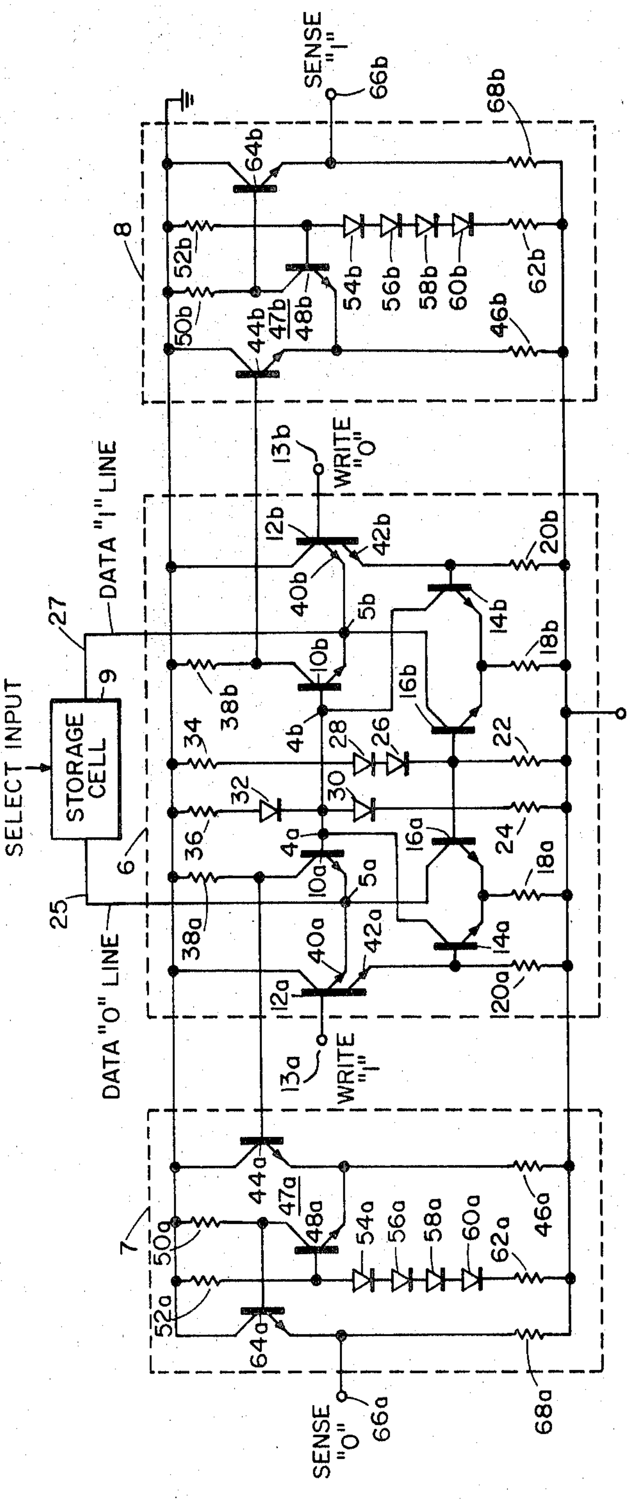
FIG. 1 is a schematic diagram of a preferred embodiment of the invention.

For purposes of describing the invention the schematic diagram in FIG. 1 can be separated into three functional blocks: the write and current sensing section 6, a differential amplifier and emitter follower output section 7 and a differential amplifier and emitter follower output section 8. The circuit in FIG. 1 is symmetrical, and the letters *a* and *b* have been used with like reference numerals to designate corresponding circuit components in sections 7 and 8 of the sense-write circuitry. By using the above numerical correspondence to designate like components in each section of the circuit, a description of section 7 will suffice to explain the operation of section 8.

IDENTIFICATION OF CIRCUIT COMPONENTS

The sense-write circuit in FIG. 1 includes first and second biasing transistors 10*a* and 10*b* emitter coupled to dual emitter write transistors 12*a* and 12*b* which have write input terminals 13*a* and 13*b* respectively. Data point 5*a* is common to these emitter coupled transistors and is designated herein as a first data point since this point is directly connected to the data "0" line. The data "1" line is directly connected to a second data point 5*b*.

Section 6 of the sense write circuit in FIG. 1 further includes a current switch comprised of a first pair of emitter coupled transistors 14*a* and 16*a* connected to the $V_{EE}$ voltage supply terminal via a first current sink resistor 18*a*. Similarly, a second current switch comprising a second pair of emitter coupled transistors 14*b* and 16b is connected via a second current sink resistor 18b to the $V_{EE}$ voltage supply terminal. The collectors of the first and second biasing transistors 10a and 10b are directly connected to the first and second differential amplifier stages 47a and 47b which include respectively emitter coupled transistors 44a and 48a and emitter coupled transistors 44b and 48b. These differential amplifier stages 47a and 47b provide increased gain and DC level shifting for signals derived from the collector outputs of the first and second biasing transistors 10a and 10b. First and second output emitter followers 64a and 64b which are connected as shown to the first and second differential amplifier stages 47a and 47b provide a low impedance output, high current drive and high fanout capabilities at the outputs of the circuitry. The sense-write circuitry in FIG. 1 is capable of driving a large plurality of current mode gates, e.g., the Motorola MECL gates.

A voltage divider including resistors 24 and 36 provides a desired bias level at points 4a and 4b in section 6 of the sense-write circuit, and diodes 32 and 30 are included in this voltage divider network to provide temperature tracking in the circuit. A second voltage divider network including resistors 22 and 34 is connected at an intermediate point thereon to the bases of the differentially coupled transistors 16a and 16b. This voltage divider network also includes diodes 26 and 28 to provide a desired temperature tracking at transistors 16a and 16b with respect to points 42a and 42b, respectively.

Temperature tracking is also provided in the output sections 7 and 8 by the connection of diodes 54a, 56a, 58a, 60a and diodes 54b, 56b, 58b and 60b at the bases of emitter coupled transistors 48a and 48b respectively. These four series connected diodes insure that the temperature induced voltage variations at transistors 48a and 48b track the temperature induced voltage variations at transistors 44a and 44b, respectively.

Additional circuit resistors will be identified below with reference to circuit operation, and these remaining individual resistor connections are known to those skilled in the art of integrated circuit construction. The resistance values of all circuit resistors are also given in a table at the end of the specification.

DESCRIPTION OF OPERATION

In order to read or interrogate the storage cell 9, the select input to the storage cell must be at a level such that current will flow in one or the other of the two data lines, i.e., data 1 line or data 0 line, and to the first and second data points 5a and 5b. This cell current will flow into the transistors 16a and 16b which function as constant current sinks in combination with resistors 18a and 18b respectively. The select input to the storage cell 9 will be further discussed below with reference to FIG. 2, but for purposes of describing FIG. 1 it will be assumed that the select input is at a proper level for sense current to flow in the data lines. It will also be assumed that the storage cell 9 is initially in a binary 0 state and that current is flowing in the data 0 line to the first data point 5a. In the read or interrogate operation of the circuit, no write signals are applied to the write transistors 12a and 12b. However, the write transistors are conducting continuously, and for read operation current is flowing in resistors 20a and 20b.

When current first begins to flow in the data "0" line and with the first biasing transistor 10a conducting, collector current for transistor 10a will decrease sharply because the current output at data point 5a is constant. This reduction in collector current produces a corresponding rise in voltage at the collector of the first biasing transistor 10a, and this voltage transition is coupled to the first emitter coupled transistor 44a in the differential amplifier stage 47a. Transistor 44a overrides transistor 48a and terminates the flow of collector current in the second emitter coupled transistor 48a. A termination of collector current of transistor 48a produces a voltage rise at the base of the output emitter follower 64a which is shifted down by a voltage drop $V_{BE}$ due to the base-emitter voltage drop of the transistor and appears at the sense "0" output terminal 66a. Thus, the binary "0" state of the storage cell 9 is reflected at the output terminal 66a. The ratio of values of the collector load resistor 50a and the current switch resistor 46a is selected so that the binary signal levels at the base of emitter follower transistor 64a will swing between values typically ranging from approximately 0 volt to −.8 volt. The $V_{BE}$ of the emitter follower transistor 64a shifts the logic swing at output terminal 66a to a range approximately −.75 volt to −1.55 volts. This logic swing is compatible with the logic levels of the typical current mode computer logic circuits presently available. One line of these current mode logic circuits is sold commercially as Motorola MECL logic circuits, and a plurality of these MECL logic circuits may be connected to the output of the emitter follower transistor 64a and simultaneously driven thereby.

Suppose now that it is desired to write into the storage cell 9 in order to change the conductive state thereof in accordance with logic signals applied to write input terminals 13a and 13b of the write transistors 12a and 12b respectively. For example, the binary conductive state of storage cell 9 may be changed by raising the voltage level at input 25 while simultaneously lowering the voltage level at input 27. Suppose that it is desired to write a binary "1" into the storage cell 9 and that the cell 9 is presently in a binary "0" state. This change of state requires raising the voltage on line 25 while simultaneously lowering the voltage on line 27, and such differential voltage change may be accomplished by applying a logic pulse to the base of the write transistor 12a. This write logic pulse drives transistor 12a to a high conductive state and raises the base voltage of the emitter coupled transistor 14a higher than the level of base voltage of transistor 16a. With transistor 14a overriding transistor 16a, no current flows from data point 5a. The latter switching action causes a voltage on line 25 to rise up to a given level and temporarily float there. When transistor 14a is biased into conduction, a relatively heavy surge of current flows through voltage divider resistor 36, diode 32 and into the collector of transistor 14a. This current flow lowers the voltage at points 4a and 4b and this negative going transition is coupled through the second biasing transistor 10b to data point 5b. Thus, as the line 25 to the storage cell 9 is driven positive, the input 27 is simultaneously driven negative to provide a differential voltage at the storage cell 9 which is sufficient in magnitude to change the conductive state of the storage cell 9 from a binary "0" state to a binary "1" state.

When the binary conductive state of the storage cell 9 has been changed from a "binary "0" to a binary "1" and the write "1" logic pulse is removed from write input terminal 13a, the first write transistor 12a will revert to a low conductive state and transistor 14a will be overridden by transistor 16a. Since the storage cell 9 is in a binary "1" state, no current will flow in the data "0" line and the collector voltage of the first biasing transistor 10a will now be reduced to a lower level by the IR drop across the collector load resistor 38a. The base of transistor 44a will also be at a low level and transistor 48a will now conduct. The current flowing through the collector load resistor 50a will drop the voltage at the base of the emitter follower output transistor 64a from approximately 0 to approximately −.8 volt, and the output logic level at output terminal 66a is now approximately −1.55 volts.

With current presently flowing in the data "1" line, there is a minimum of collector current flowing in the second biasing transistor 10b, and the collector of transistor 10b is at a high logical level. This high level is translated down to a current mode logic level in the output section 8 of the sense write circuit, and the sense "1" output terminal **66*b* connected to the emitter follower output transistor 64*b* is also at a high current mode logical level, i.e., approximately −.75 volt for the two exemplary binary logic levels given above for the current mode MECL circuits. Transistors 16*a* and 16*b* are both conducting again (no write signals applied) and these latter transistors sink constant currents from circuit first and second data points 5*a* and 5*b***, respectively.

Figure 2:
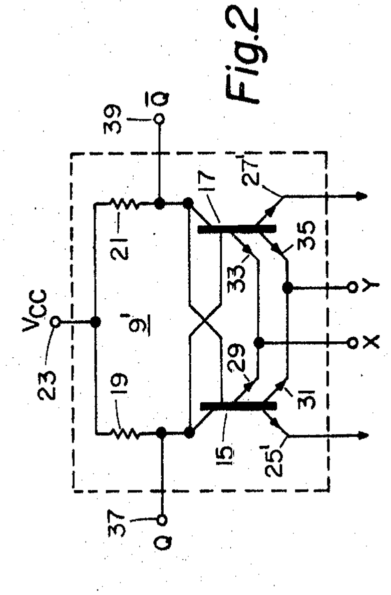
FIG. 2 is a schematic diagram of a typical multiple-emitter saturated storage cell which is shown in block form in FIG. 1.

The multiple emitter flip flop circuit in FIG. 2 is one of many types of saturated flip flops which may be used as the storage cell 9 in FIG. 1. The multiple emitter flip flop in FIG. 2 includes a pair of transistors 15 and 17 connected via collector load resistors 19 and 21 to a collector supply potential $V_{CC}$. The emitters 29 and 31 of transistor 15 are coupled respectively to emitters 33 and 35 of transistor 17, and the X and Y select inputs are connected as shown to the emitters of transistors 15 and 17. The emitters 25′ and 27′ in FIG. 2 correspond to the outputs 25 and 27 of the storage cell 9 in FIG. 1, and these emitters are to be connected to the data "0" and date "1" lines when the multiple emitter flip flop in FIG. 2 is used as the storage cell 9 in FIG. 1.

When either the X or the Y select input is lower than the output emitters 25′ and 27′, the binary conductive state of the flip flop 9′ will remain unchanged, and variations in the potential at emitters 25′ and 27′ will not affect the binary state of the flip flop 9′. Assume for purposes of explanation that the base potential of transistor 15 is higher than that of transistor 17 and that transistor 15 is conducting. Current will flow through either one or both of the emitters 29 and 31 and to the X and Y lines depending upon which select line is low. With transistor 15 conducting, the $\overline{Q}$ output at terminal 39 is high and the Q output at terminal 37 is low. If now both select inputs X and Y rise to a predetermined logical level which is higher than the potential at which emitters 25′ and 27′ are biased, current through transistor 15 will be forced to flow through emitter 25′ and in the data "0" line. Thus, when the multiple emitter flip flop 9′ is used as a storage cell 9 in FIG. 1, the collector of the first biasing transistor **10*a* is driven to a high logical level, and similarly the sense "0" output at terminal 66*a*** is also driven to a high logical level.

If it is now desired to change the conductive state of the multiple emitter storage cell 9′ as described above with reference to FIG 1, a differential voltage must be applied between emitters 25′ and 27′ to turn off transistor 15 and simultaneously turn on transistor 17. This switching action can be accomplished by applying a write "1" logic pulse to the first write transistor **12*a*, driving the potential on the emitter 25′ high and left temporarily floating. Simultaneously the potential on the emitter 27′ is driven negative to produce a differential voltage between emitters 25′ and 27′ sufficient in magnitude to initiate a change in the conductive state of the flip flop 9. A change in the voltage of only one emitter (25′ or 27′) will not provide a sufficient differential voltage between emitters 25′ and 27′** to guarantee a change in the conductive state of the storage cell due to the limited amplitude of the write input logic swing.

In the following table, voltage and resistance values are listed for a circuit of the type shown in FIG. 1 which has been actually built and successfully tested. However, said table should not be construed as limiting the scope of this invention.

TABLE

| | | Value |
|---|---|---|
| Voltage: | | |
| $V_{CC}$ | volts | 0 |
| $V_{EE}$ | do | −5.2 |
| Resistor (R): | | |
| R18*a* | kilohms | 1.9 |
| R18*b* | do | 1.9 |
| R19 | do | 3.1 |
| R20*a* | kilohms | 3.0 |
| R20*b* | do | 3.0 |
| R21 | do | 3.1 |
| R22 | do | 3.0 |
| R24 | do | 3.0 |
| R34 | ohms | 365 |
| R36 | do | 365 |
| R38*a* | do | 950 |
| R38*b* | do | 950 |
| R46*a* | kilohms | 1.5 |
| R46*b* | do | 1.5 |
| R50*a* | ohms | 335 |
| R50*b* | do | 335 |
| R52*a* | do | 785 |
| R52*b* | do | 785 |
| R62*a* | kilohms | 1.0 |
| R62*b* | do | 1.0 |
| R68*a* | do | 1.5 |
| R68*b* | do | 1.5 |

We claim:

1. A sense-write circuit for setting and sensing the state of a saturated storage cell and providing constant voltage and constant current inputs thereto, said sense-write circuit including, in combination:

(a) first and second biasing transistors connected to a first bias potential, (b) a first write transistor emitter coupled to said first biasing transistor, (c) a second write transistor emitter coupled to said second biasing transistor, (d) a first current switching means connected to a first data point common to said first write transistor and said first biasing transistor for controlling the potential at said first data point in response to write signals applied to said first write transistor, (e) a second current switching means connected to a second data point common to said second write transistor and said second biasing transistor for controlling the potential at said second data point in response to write signals applied to said second write transistor, said first and second current switching means providing a constant current from said first and second data points respectively, whereby said first and second data points may be connected to first and second output terminals of a saturated binary storage cell to conduct constant current therefrom and interrogate same; the current flowing from said storage cell and through the first or second data points producing a corresponding change in voltage at the outputs of said first and second biasing transistors which indicates the binary state of said storage cell.

2. The sense write circuit as defined in claim 1 wherein:

(a) said first current switching means includes a first pair of emitter coupled transistors connected to a potential supply means, said first write transistor connected to one transistor in said first pair and the other transistor in said first pair connected to said first data point, whereby signals applied to said first write transistor and coupled to said one transistor in said first pair biases said one transistor into conduction to change the potential at said first data point, (b) said second current switching means includes a second pair of emitter coupled transistors connected to said potential supply means, one transistor in said second pair connected to said second write transistor and conductively controlled thereby, the other transistor in said second pair connected to said second data point, whereby write signals applied to said write transistor are coupled to said other transistor to bias same into conduction to change the potential at said second data point, said one transistor in each of said first and second transistor pairs cross-coupled respectively to said second and first biasing transistors so that when said one transistor in each pair is biased into conduction, the potential at said second and first biasing transistors is changed, such potential change being reflected at one of said second and first data points, respectively, whereby the potential difference between the first and second data points is sufficient to change the conductive state of said binary storage cell.

3. The sense write circuit as defined in claim 2 which further includes: voltage amplifying and translating means coupled to the output of said first biasing transistor for amplifying the signal at the output of said first biasing transistor and shifting the DC level thereof to provide a predetermined current mode output logic swing.

4. The sense-write circuit as defined in claim 3 wherein:

(a) said first and second biasing transistors are connected respectively through first and second load resistors to a point of reference potential, (b) said first and second pairs of emitter coupled transistors in said current switching means connected respectively through first and second current sink resistors to said potential supply means; an increase in current from said binary storage cell and through said first and second data points causing a corresponding decrease in current through said first or second biasing transistors and producing a corresponding change in signal level at the outputs of said first or second biasing transistors.

5. The sense-write circuitry as defined in claim 4 wherein:

(a) said voltage amplifying and translating means includes first and second emitter coupled differential amplifiers connected respectively to the outputs of said first and second biasing transistors for translating the DC levels of the signals at the outputs of the first and second biasing transistors to current mode logic levels, and (b) said voltage amplifying and translating means further including first and second output emitter follower transistors directly connected to the first and second differential amplifiers for providing two different binary levels of logic and a high fanout and current drive capability at the outputs of the sense-write circuitry.

6. The sense-write circuitry as defined in claim 5 wherein said saturated storage cell is a $T^2L$ saturating flip-flop circuit having a pair of emitter coupled transistors connected in a bistable circuit configuration wherein the transistors alternately conduct as the flip-flop is switched between its two stable states, said $T^2L$ flip-flop having its emitter coupled transistors connected to common select input points for receiving select signals necessary to condition the flip-flop for a change in its conductive state, said pair of emitter coupled transistors having additional inputs which are directly connected respectively to the first and second data points in the sense-write circuitry for receiving a potential difference thereon which is sufficient in magnitude to change the conductive state of the $T^2L$ flip-flop.

References Cited

UNITED STATES PATENTS

| | | | |
|---|---|---|---|
| 3,423,737 | 1/1969 | Harper | 340—173 |
| 3,427,598 | 2/1969 | Kubinec | 340—173 |
| 3,436,738 | 4/1969 | Martin | 340—173 |
| 3,440,444 | 4/1969 | Rapp | 307—238 |

DONALD D. FORRER, Primary Examiner

S. D. MILLER, Assistant Examiner

U.S. Cl. X.R.

307—235, 291, 299; 330—30; 340—173